(12) United States Patent
Bendele et al.

(10) Patent No.: US 11,760,489 B2
(45) Date of Patent: Sep. 19, 2023

(54) AIRCRAFT SEAT DEVICE

(71) Applicant: RECARO Aircraft Seating GmbH & Co. KG, Schwaebisch Hall (DE)

(72) Inventors: Philipp Bendele, Schwäbisch Hall (DE); Michael Fritz, Rosengarten (DE); Pavel Ivanov, Ellhofen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 115 days.

(21) Appl. No.: 17/430,284

(22) PCT Filed: Feb. 14, 2020

(86) PCT No.: PCT/EP2020/053971
§ 371 (c)(1),
(2) Date: Aug. 11, 2021

(87) PCT Pub. No.: WO2020/165441
PCT Pub. Date: Aug. 20, 2020

(65) Prior Publication Data
US 2022/0127002 A1   Apr. 28, 2022

(30) Foreign Application Priority Data
Feb. 14, 2019   (DE) .................... 10 2019 103 813.8

(51) Int. Cl.
*B64D 11/06*   (2006.01)

(52) U.S. Cl.
CPC ...... *B64D 11/0605* (2014.12); *B64D 11/0606* (2014.12)

(58) Field of Classification Search
CPC .................... B64D 11/605; B64D 11/0606
See application file for complete search history.

(56) References Cited

U.S. PATENT DOCUMENTS

| 2009/0223417 A1 | 9/2009 | Muirhead |
| 2014/0300146 A1 | 10/2014 | Thisius et al. |

(Continued)

FOREIGN PATENT DOCUMENTS

| CA | 2 891 738 A1 | 6/2012 |
| CN | 208731228 U | 4/2019 |

(Continued)

OTHER PUBLICATIONS

German Search Report dated Feb. 5, 2020 issued in corresponding DE Application No. 10 2019 103 813.8 ( and English translation).

(Continued)

*Primary Examiner* — Anthony D Barfield
(74) *Attorney, Agent, or Firm* — POSZ LAW GROUP, PLC

(57) ABSTRACT

An aircraft seat device with at least one shell element, with at least one table unit, with at least one support device that is configured to obliquely connect the at least one table unit to the shell element at least in a stowage position, the support device comprising at least one rotational bearing unit, which is configured for pivoting the table unit between the stowage position and at least one intermediate position that is situated substantially in a horizontal plane, the support device comprising at least one linear bearing unit, which is configured for traversing the table unit between the intermediate position and at least one completely deployed usage position that is close to a seat.

14 Claims, 7 Drawing Sheets

(56) References Cited

U.S. PATENT DOCUMENTS

Figure 1:
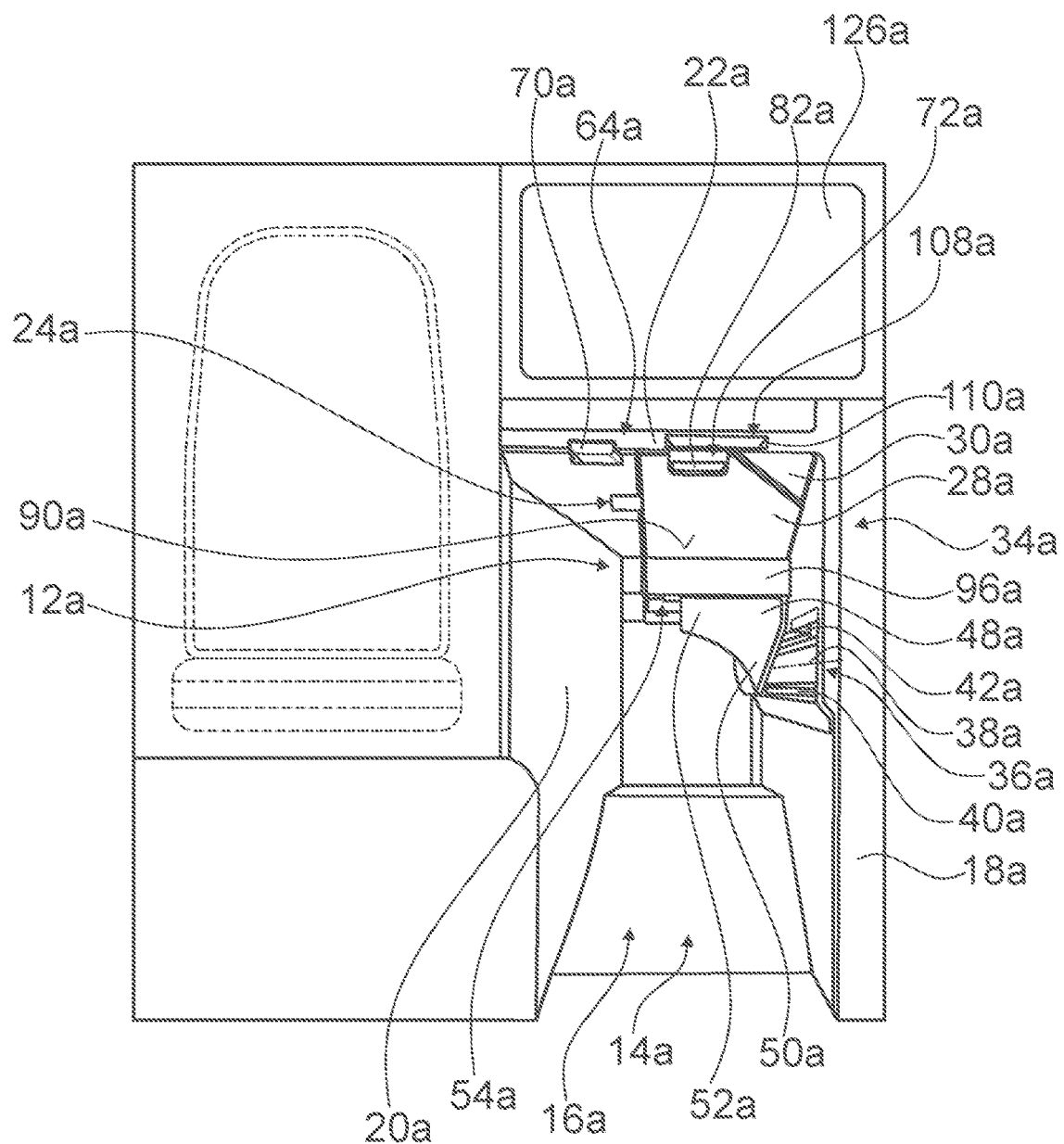

| | | |
|---|---|---|
| 2016/0376008 A1* | 12/2016 | Kuyper .................... 244/122 R |
| 2018/0281966 A1 | 10/2018 | Chuang et al. |
| 2018/0297708 A1 | 10/2018 | Ducreux et al. |

FOREIGN PATENT DOCUMENTS

| | | |
|---|---|---|
| DE | 60 2004 006 122 T2 | 12/2007 |
| DE | 102006043483 A1 * | 3/2008 |
| DE | 10 2008 012 523 A1 | 9/2009 |
| EP | 0 980 826 A2 | 2/2000 |
| EP | 2 955 058 A1 | 12/2015 |
| WO | 2004/113168 A1 | 12/2004 |
| WO | 2006/030228 A1 | 3/2006 |
| WO | 2008/031506 A1 | 3/2008 |
| WO | 2015/013494 A1 | 1/2015 |

OTHER PUBLICATIONS

International Preliminary Report on Patentability of Patent Cooperation Treaty dated Aug. 10, 2021 issued in corresponding international application No. PCT/EP2020/053971.

International Search Report of the International Searching Authority dated May 26, 2020 for the corresponding International application No. PCT/EP2020/053971.

\* cited by examiner

AIRCRAFT SEAT DEVICE

CROSS REFERENCE TO RELATED APPLICATIONS

This application is a U.S. national stage application of PCT/EP2020/053971 filed on Feb. 14, 2020, which is based on German Patent Application No. 10 2019 103 813.8 filed on Feb. 14, 2019, the contents of which are incorporated herein by reference.

STATE OF THE ART

The invention concerns an aircraft seat device according to patent claim 1.

Aircraft seat devices with a shell element and with a table unit that is connected thereto have already been proposed.

The objective of the invention is in particular to provide a generic device with improved characteristics regarding comfort, regarding space requirements in a stowage position and regarding an especially advantageous and intuitive operation by a passenger. The object is achieved according to the invention by the features of patent claim 1 while advantageous implementations and further developments of the invention may be gathered from the subclaims.

Advantages of the Invention

According to the invention an aircraft seat device is proposed, with at least one shell element, with at least one table unit, with at least one support device that is configured to obliquely connect the at least one table unit to the shell element at least in a stowage position, the support device comprising at least one rotational bearing unit, which is configured for pivoting the table unit between the stowage position and at least one intermediate position situated substantially in a horizontal plane, the support device comprising at least one linear bearing unit, which is configured for traversing the table unit between the intermediate position and at least one completely deployed usage position that is close to a seat. "Configured" is in particular to mean specifically designed and/or equipped. By an object being configured for a certain function is in particular to be understood that the object fulfills and/or executes said certain function in at least one application state and/or operation state. By an "aircraft seat device" is in particular a device to be understood which forms at least part of an aircraft seat module. By an "aircraft seat module" is in particular a module to be understood which defines a flight passenger seat region and for this purpose comprises at least one shell element, which separates the flight passenger seat region at least partly from the remaining cabin area, at least one aircraft seat arranged in the flight passenger seat region, and further elements of the flight passenger seat region, like in particular a console, an ottoman and/or a screen unit. The aircraft seat is herein preferably implemented as a single seat. By a "flight passenger seat region" is here in particular a region to be understood in which at least one aircraft seat, preferably an aircraft seat implemented as a single seat, or a seat unit formed of at least two aircraft seats is arranged, and which is configured for a sojourn of at least one passenger during a flight in an aircraft. Preferably further elements are arranged in a seat region, which are usable by a passenger, like in particular a console, an ottoman, stowage facilities, deposition elements and/or entertainment devices. The flight passenger seat region is in particular realized as a partial region of a cabin, in particular an aircraft cabin. By a "shell element" is in particular an element to be understood which at least partially encompasses at least a portion of an aircraft seat region, preferably in particular a foot space of the aircraft seat region. The shell element is preferably implemented as a shell element that is preferably made of a composite material or of a light metal. Principally it is also conceivable that the shell element is implemented at least partly of a synthetic material. The shell element preferentially forms a portion of a second aircrafts seat module, which is arranged neighboring to and/or in front of the aircraft seat module. Preferably, the shell element in particular forms at least a portion of a console of the aircraft seat module that is situated in front. Preferably it is also conceivable that a deposition compartment is inserted in the shell element in a region between the ottoman and a monitor screen. The deposition compartment is preferably inserted in an upper wall of the shell element. Advantageously the deposition compartment extends obliquely, in particular obliquely downward, which allows an advantageous arrangement of stowed objects in the deposition compartment. Advantageously the oblique deposition compartment in particular extends parallel to the oblique underside of the upper wall of the shell element. Principally it is also conceivable, in particular in case of a front aircraft seat region in an aircraft cabin, that the shell element is implemented as part of an aircraft side wall. By a "table unit" is in particular a unit to be understood which, at least in a usage position, forms a table support surface allowing a user, in particular a flight passenger, to deposit objects on. In order to form a table support surface, the table unit preferably comprises at least a table base body, which forms at least a portion of the table support surface in at least one position. The table unit is preferably in at least one stowage position, in at least one intermediate position and a usage position. Preferentially the table unit is implemented of at least two elements which are arranged pivotably relative to one another, preferably a table base body and a table body. By a "stowage position" is here in particular a position of the table unit to be understood in which the table unit is not configured to be used for depositing objects. In the stowage position the table unit is preferably retracted in a housing, preferably in particular retracted in the shell element, such that it is remote from a movement region of a person sitting on an allocated aircraft seat. Preferentially, in the stowage position the table unit is arranged completely within a housing, with one side of the table plate preferably closing off the housing. Preferably, in the stowage position the table unit is arranged completely in a space spanned by the shell element, in particular on an upper wall that delimits a foot space. "Obliquely" is in particular to mean at an angle relative to a mounting plane that is unequal to 0° and unequal to 90°. Preferentially, oblique is in particular to mean an angle relative to the mounting plane that is between 10° and 45°. By a "support device" is in particular a device to be understood which comprises at least one support unit movably supporting an element, like in particular the table unit, relative to a further element, like in particular the shell element. Preferably, the support device may in particular be configured to adjust the element from its stowage position into at least one usage position. In particular, for an adjustment of the table unit, the support device may be configured to pivot and to linearly displace the table unit. Preferably the support device is configured to execute a pivoting and a linear displacement of the table separately from each other. Preferably either the pivoting or the linear displacement of the table unit can be executed by means of the support device. Preferably a simultaneous pivoting and linear displacement of the table unit is impossible. However, it is principally also conceivable that in a further implementation the support device is configured for least partly simultaneous pivoting and linear displacement of the table unit. By a "rotational bearing unit" is in particular a unit to be understood which supports an element, like in particular the table unit, such that it is pivotable relative to a further element. The rotational bearing unit supports an element, in particular the table unit, rotationally around at least one rotation axis. Preferably the element supported by the rotational bearing unit, in particular the table unit, is pivotable by a defined pivot angle between a first position and at least one second position. Principally it is also conceivable that the element that is to be pivoted, in particular the table unit, is pivotable in more than two positions. Preferably, the table unit is supported by the rotational bearing unit in a dampened manner in at least one direction, preferably toward the intermediate position. By a "horizontal plane" is in particular a plane to be understood that is oriented substantially horizontally, i.e. substantially parallel to a mounting plane. By an "intermediate position" is in particular a position of the table unit to be understood which is in particular arranged between a stowage position and a frontward usage position. In an adjustment between the stowage position and the usage position, the table unit is at least for a short time arranged in the intermediate position. In a traversing between the stowage position and the usage position, the intermediate position is taken by the table unit automatically. Advantageously it is principally conceivable that in the intermediate position at least a portion of the table unit can be used by a passenger, in particular for example for a deposition of objects, like for example a smartphone, or as a beverage holder. Preferably the table unit is lockable in the intermediate position. Locking of the table unit in the intermediate position advantageously enables the table unit to be usable also in a TTL situation (taxi, takeoff, landing situation). By a "linear bearing unit" is in particular a bearing unit to be understood which is configured for traversing an element, like in particular the table unit, between at least two positions linearly, in particular along a displacement axis. For this purpose, a linear bearing unit comprises at least one stationary guiding rail and a guiding element that is supported such that it is displaceable therein. By a "usage position that is close to a seat" is here in particular a position of the table unit to be understood in which the table unit is adjusted by means of the support device maximally toward an aircraft seat of the aircraft seat region. Preferably, in the usage position close to a seat, the table unit is in particular arranged at least partly above a sitting region of the aircraft seat of the aircraft seat region which the table unit is part of. An implementation according to the invention allows providing an aircraft seat device which comprises an especially advantageous table unit that can in particular be stowed in an advantageous space-saving manner, that can be adjusted from a stowage position into a usage position in an advantageous intuitive manner, and that has an especially advantageous usage position as well as an intermediate position in which the table unit is also usable. Advantageously the implementation according to the invention in particular allows providing an aircraft seat region having, in a vertical direction, a particularly advantageously large leg space in the region of the stowed table unit, in particular in a lying-down position of the aircraft seat, such that a passenger may be provided with a particularly advantageously large lying-down area.

It is further proposed that the linear bearing unit forms a bearing axis, which is oriented obliquely to a mounting plane. By a "bearing axis" is in particular an axis to be understood along which the table unit is traversable between at least two positions. The bearing axis is preferably implemented by a straight line. Principally it however also conceivable that the bearing axis is implemented by a curved path. By a "mounting plane" is in particular a plane to be understood which an aircraft seat device is connected to. Preferentially the mounting plane is in particular implemented by a cabin floor of an aircraft, which the aircraft seat device is mounted on. By the term that the bearing axis "is oriented obliquely to a mounting plane" is in particular to be understood that a rear end of the bearing axis has a different, preferably a greater, perpendicular distance from the mounting plane than a front end of the bearing axis. By the obliquely-oriented bearing axis the table unit is advantageously also adjusted in height, preferably lowered, in case of an axial movement toward an aircraft seat. Preferably the bearing axis is herein in particular inclined rearwards by an angle of 8°. Principally it is also conceivable that the bearing axis includes an angle of 0° to 15° with the mounting unit. As a result, the table unit can be supported by means of the linear bearing unit in an especially advantageous manner.

Furthermore, it is proposed that the support device comprises at least one locking unit, which locks the table unit in the intermediate position. By a "locking unit" is in particular a unit to be understood which is configured for a positionally fixed locking of the table unit in a defined position, preferably in particular in the intermediate position. Preferentially the locking unit is configured for automatically locking the table unit in the intermediate position. The locking unit is preferably configured, if the table unit is adjusted from the stowage position or from the usage position into the intermediate position, to automatically lock the table unit as soon as it is arranged precisely in the intermediate position. Preferably, in particular in a locking position, the locking unit is configured to lock the table unit in a defined position, in particular in the intermediate position. Preferably, the locking unit is in particular configured to automatically take the locking position as soon as the table unit is arranged in the intermediate position. The locking unit is preferably configured to unlock the table unit in an unlocking position. The locking unit is in particular configured to release the table unit in the unlocking position. In the unlocking position of the locking unit the table unit can be moved out of the intermediate position. Preferably, in the unlocking position of the locking unit the table unit can be adjusted out of the intermediate position into the usage position and/or into the stowage position. "Locking" is in particular to mean stationarily fixating in a defined position, in particular the intermediate position, relative to a reference element by means of a form-fit and/or force-fit connection. By "unlocking" is in particular to be understood that a form-fit and/or force-fit connection configured for locking the table unit in a position, in particular the intermediate position, is released such that the table unit can be moved out of the intermediate position. In this way it is advantageously possible for the table unit to be fixated in the intermediate position and to be at least partially used in said intermediate position.

It is also proposed that the locking unit comprises at least one actuation element, by means of which the locking unit can be unlocked and the table element can be moved out of the intermediate position. By an "actuation element" is in particular an element to be understood that is operable, preferably manually operable, by an operator, preferably a passenger, for unlocking the locking unit, that is for switching the locking unit from a locking position into an unlocking position. The actuation element is preferably embodied as an actuation lever which is configured to be pivoted by a user. Principally it is also conceivable that the actuation element is implemented as a push button, as an electric or electronic actuation element, or as another actuation element that is deemed expedient by someone skilled in the art. Preferably it is also conceivable that the actuation element is implemented as an electric or electronic component, in particular as an electronic switch. Preferably, it is in particular also conceivable that the actuation element is implemented by a switching surface on a touch-sensitive switch. It is in particular also conceivable that the actuation element is implemented as part of an operating cluster, in particular an operating cluster on a touch-screen. Preferably, it is in particular conceivable that a corresponding electric or electronic operating element is directly connected with an aircraft seat. Preferentially it is also conceivable that the operating element is implemented by an operating switching surface in an operation program running on a smartphone or on a tablet, the smartphone or the tablet being preferably coupled with the aircraft seat in a wireless or in a wire-bound manner. With an electronic operation of the table unit, the locking unit preferably comprises an electronic sensor, which in particular detects when the table unit is arranged completely in the intermediate position. Preferably, an electronic unlocking of the locking unit by means of an electronic actuation element is not released before reaching of the intermediate position of the table unit has been captured by the sensor. As a result, the table unit can be moved out of the intermediate position in an advantageously simple manner.

It is moreover proposed that the locking unit comprises at least one securing unit, which prevents an unlocking until the table unit is completely arranged in the intermediate position. By a "securing unit" is in particular a unit to be understood which prevents an actuation of the locking unit, in particular an adjustment of the locking unit from a locking state into an unlocking state, if the table unit is not completely arranged in the intermediate position. In this way faulty operation of the table unit is advantageously easily preventable and an intuitive operation of the table unit is achievable.

Beyond this it is proposed that the table unit is implemented of a first table base body and at least one table body, which is arranged so as to be pivotable in a transverse direction relative to the table base body. A "table base body" is in particular to mean a main body of the table unit, which is in particular connected directly to the support device. The table base body is preferably connected to the shell element via the support device. The table base body preferably forms a major portion of the table unit. The table base body is preferably implemented by a planar plate. The table base body may, for example, be implemented of a composite material or of a light metal. By a "table body" is in particular a part of the table unit to be understood that is configured, in at least one state, to augment the table surface provided by the table base body. In a usage position of the table body, the table body is configured to augment the table base body and to form the entire table support surface of the table unit together with the table base body. It is principally conceivable that the table base body and the table body that is connected thereto are substantially of the same size. Principally it is also conceivable that the table body is implemented so as to be larger than the table base body, or vice versa. The table body is a part of the table unit. In particular, the table body is implemented by a planar plate. Preferably the table body has a same thickness and a same depth as the table base body, such that the table body and the table base body form a uniform table unit in a usage position of the table body. The table body is herein preferably connected pivotably with the table base body via at least one hinge. Principally it would also be conceivable that a table body is connected with the table base body in a differently adjustable manner, for example via a telescope-like linear displacement. This allows realizing the table unit in an especially advantageous manner.

It is further proposed that the table unit comprises at least one abutment element, which is configured, in a deployed state of the table unit, to prevent a displacement of the table unit from a usage position into the intermediate position. By an "abutment element" is in particular an element to be understood which in a defined position abuts on a correspondingly formed element, such that in at least one operation state a movement of an element, like in particular a linear displacement of the table unit, is limited to a maximum distance. Preferably, the abutment element is in particular implemented by a portion of the table unit, preferably in particular by an edge of the table body, which is pivotably connected to the table base body. Principally it is also conceivable that the abutment element is implemented by a separate abutment element, which is in particular configured to engage into the linear bearing unit so as to limit a displacement distance of the table unit in its deployed state. Herein it is in particular conceivable that in a deployed state of the table unit, the abutment element is brought into the locking position by means of a mechanism mounted in the table unit, wherein in the locking position the abutment element abuts on a correspondingly formed abutment element in a defined position of the linear bearing unit in order to limit a travel distance of the table unit, as a result of which in particular a limitation of the travel distance of the table unit is achievable without a direct abutment on the shell element. In this way faulty operation of the table unit when traversing into the stowage position is advantageously avoidable.

Furthermore, it is proposed that the support device comprises at least one locking module, by means of which the table unit can be secured on the shell element in the stowage position. By a "locking module" is in particular a module to be understood which is configured to lock the table unit in a positionally fixed manner in a defined position, preferably in particular in the stowage position. Preferably the locking module is configured to automatically lock the table unit in the intermediate position. The locking module is preferably configured, when the table unit is adjusted into the stowage position, to automatically lock the table unit as soon as it is arranged exactly in the stowage position. The locking module is preferably configured, in particular in a locking position, to lock the table unit in a defined position, in particular in the stowage position. Preferably, the locking module is in particular configured to automatically take the locking position as soon as the table unit is arranged in the stowage position. The locking module is preferably configured to unlock the table unit in an unlocking position. The locking module is in particular configured to release the table unit in the unlocking position. In the unlocking position of the locking module the table unit can be moved out of the stowage position. Preferably, in the unlocking position of the locking module the table unit can be moved out of the stowage position into the intermediate position. "Secured" is in particular to mean fixating, stationarily relative to a reference element, in a defined position, in particular the stowage position, by a form-fit and/or force-fit connection. By "unlocking" is in particular to be understood that a form-fit and/or force-fit connection, which is configured for a locking of the table unit in a position, in particular the stowage position, is released such that the table unit can be moved out of the stowage position. This allows an especially advantageous stowage of the table unit.

It is moreover proposed that the locking module comprises at least one securing element which is configured, for a securing of the table unit, to engage into the table unit sidewise in a form-fit fashion. By a "securing element" is in particular a form-fit and/or force-fit element to be understood which fixates the table unit in a locked state, in a force-fit and/or form-fit manner, to an element that is to be fixated, like in particular the shell element. The securing element is preferably implemented as a form-fitting element, in particular as a movably supported locking pin. Preferably, the securing element implemented as a locking pin is in particular arranged movably in the shell element and in a locked state engages into the table unit. This allows an especially advantageous implementation of the locking module.

It is also proposed that the locking module comprises at least one actuation member, which is configured for an actuation of the locking module and is connected to the shell element at least substantially sidewise next to the table unit. By an "actuation member" is in particular a member to be understood which is, preferably manually, operable by an operator, in particular a passenger, for unlocking the locking module, that is for switching the locking module from a locking position into an unlocking position. The actuation member is preferably realized as an actuation lever, which is configured to be pivoted by an operator. Principally it is also conceivable that the actuation member is embodied as a push button, as an electric or electronic actuation element, or as another actuation element that is deemed expedient by someone skilled in the art. Preferably it is also conceivable that the actuation member, like the actuation element of the locking unit, is embodied as an electric or electronic component, in particular as an electronic switch. Principally it is also conceivable that the actuation member of the locking module and the actuation element of the locking unit are implemented integrally. Preferably the integrally implemented actuation member may be realized as a mechanical or as an electric/electronic actuation element. In this way the table unit can be released out of its stowage position in a particularly simple manner.

Beyond this it is proposed that the linear bearing unit comprises at least two guiding rails, which extend in parallel and are arranged in a lateral side wall of the shell unit. By a "guiding rail" is in particular a linear guiding element to be understood which is configured to form a bearing path, preferably a straight bearing axis, along which a further element is linearly displaceable on the guiding rail. A guiding rail is configured such that a guiding element is connected thereon in a form-fit and/or force-fit manner, wherein the guiding element has a degree of freedom relative to the guiding rail at least in one axis, in particular along the bearing axis. Preferably it is principally also conceivable that one of the at least two guiding rails of the linear bearing unit is mounted in an opposite-situated second side wall or in an upper wall of the shell element. This allows an especially advantageous implementation of the linear bearing unit.

It is also proposed that the support device comprises at least one support arm, which is linearly displaceable by means of the linear bearing unit and is connected to the table unit so as to be pivotable via the rotational bearing unit. In this way the table unit can be connected to the shell element in a particularly advantageous fashion.

Furthermore, it is proposed that the support device comprises a usage position securing unit, which is configured for securing the table unit in the usage position when the table unit is not arranged in the intermediate position. By a "usage position securing unit" is in particular a unit to be understood which in at least one state fixates the table by a form-fit and/or force-fit connection relative to a further element, like in particular the support arm, which the table unit is pivotably arranged on. The usage position securing unit is in particular configured for securing the table unit in the usage position in a substantially horizontal orientation. In this way it is advantageously possible to prevent a pivoting of the table unit upwards out of the usage position while in use, for example by inadvertent pushing by a foot.

It is moreover proposed that the support arm forms a supplemental element in a region arranged behind the table. By a "supplemental element" is in particular an element to be understood which in particular provides an additional function for a passenger. A supplemental element is preferably implemented as an additional table element, as a holder for electronic devices, like in particular a smartphone or a tablet, or as a storage box. In this way an additional usage of the support arm is particularly advantageously possible.

It is further proposed that the support arm forms at least one support surface, via which the table unit is at least partly supported in the usage position. By a "support surface" is in particular a surface to be understood via which forces acting onto the table unit, in particular weight forces of objects situated on the table unit or support forces of a person, are introduced into the support arm. This advantageously allows forces acting onto the table unit being introduced into the support arm in a particularly simple manner and, for example, a rotational bearing unit, via which the table unit is pivotably connected to the support arm, being implemented in an advantageously small and lightweight fashion.

The aircraft seat device according to the invention is herein not to be limited to the application and implementation described above. In particular, in order to fulfill a functionality that is described here, the aircraft seat device according to the invention may comprise a number of individual elements, components and units that differs from a number given here.

DRAWINGS

Further advantages will become apparent from the following description of the drawings. In the drawings two exemplary embodiments of the invention are illustrated. The drawings, the description and the claims contain a plurality of features in combination. Someone skilled in the art will purposefully also consider the features separately and will find further expedient combinations.

Figure 2:
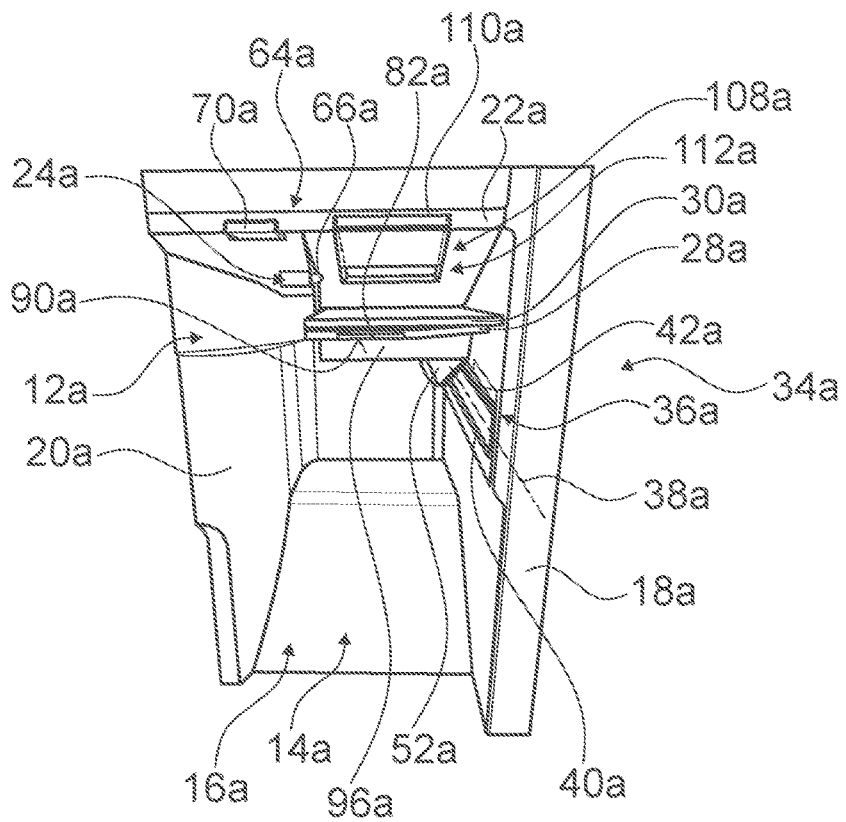
Figure 3:
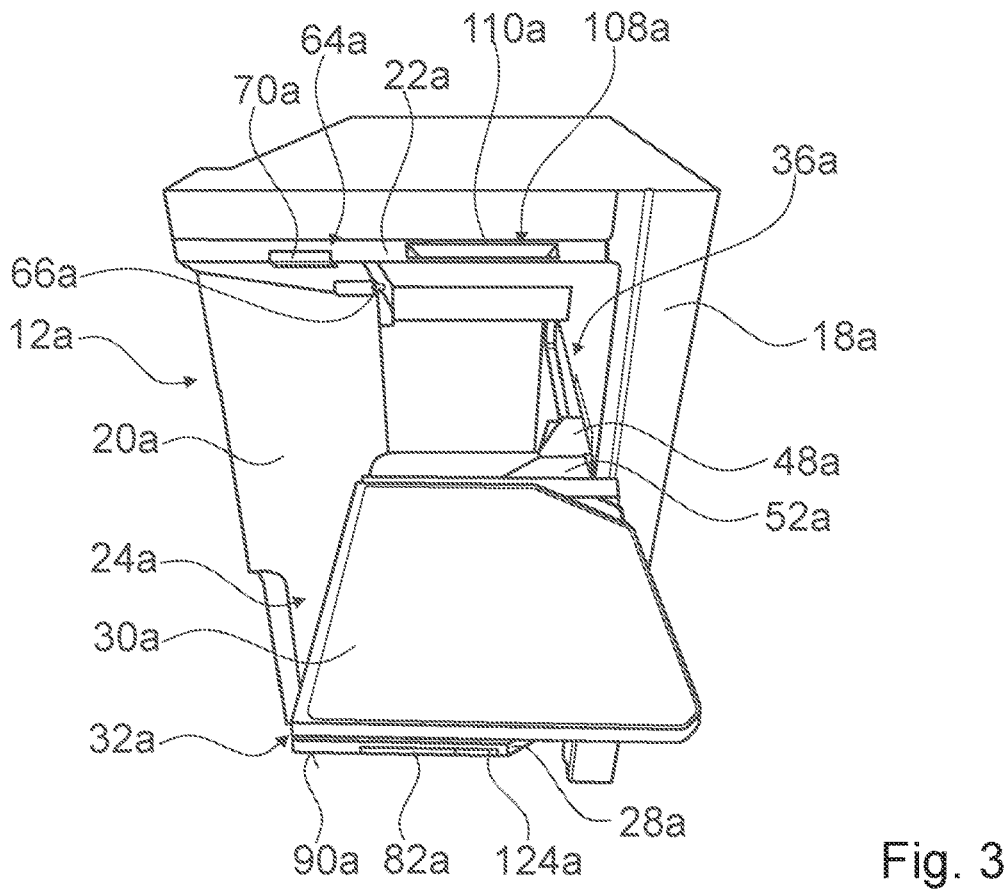
Figure 4:
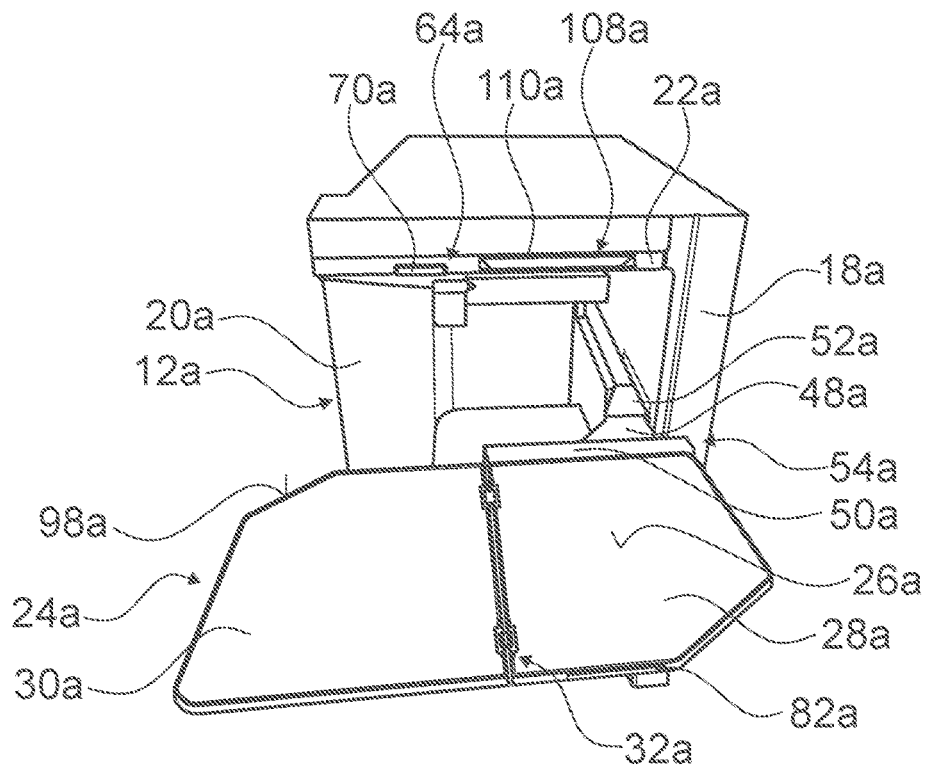
Figure 5:
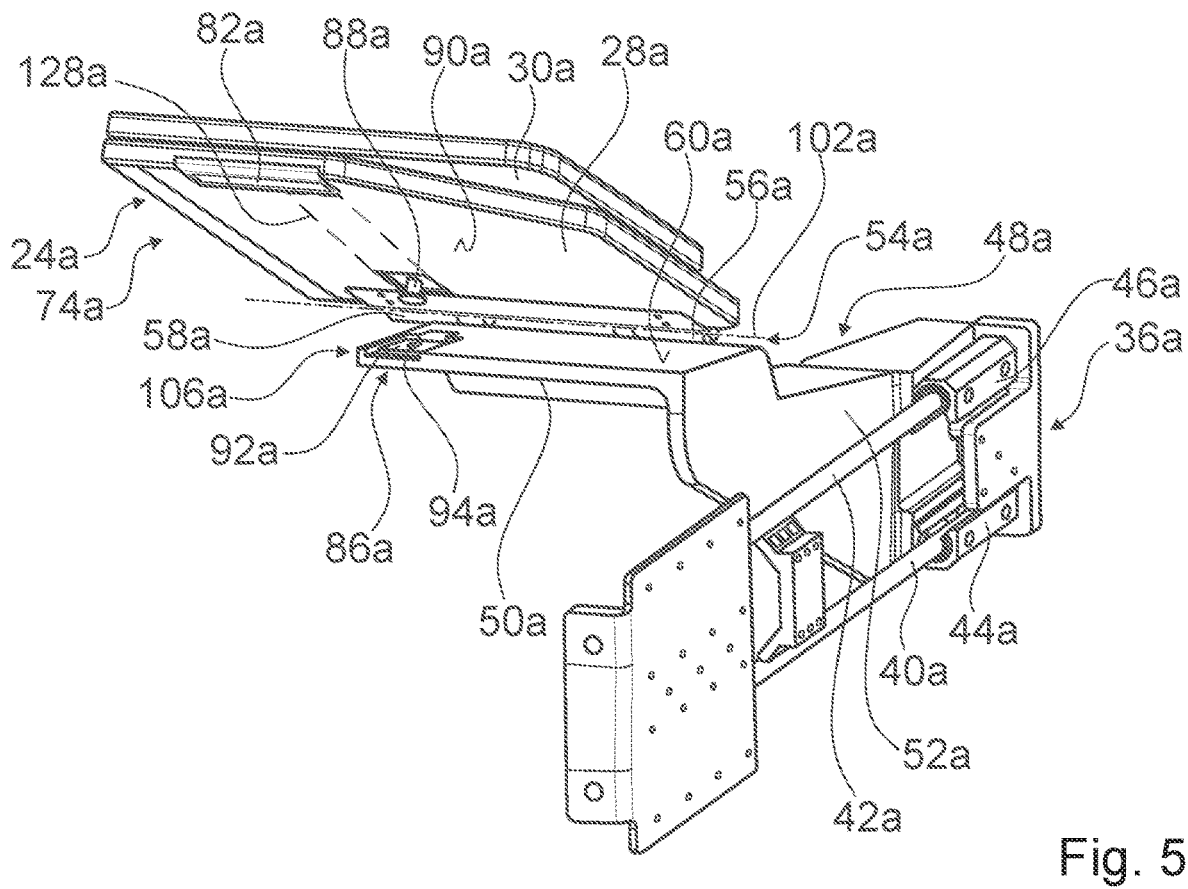
Figure 6:
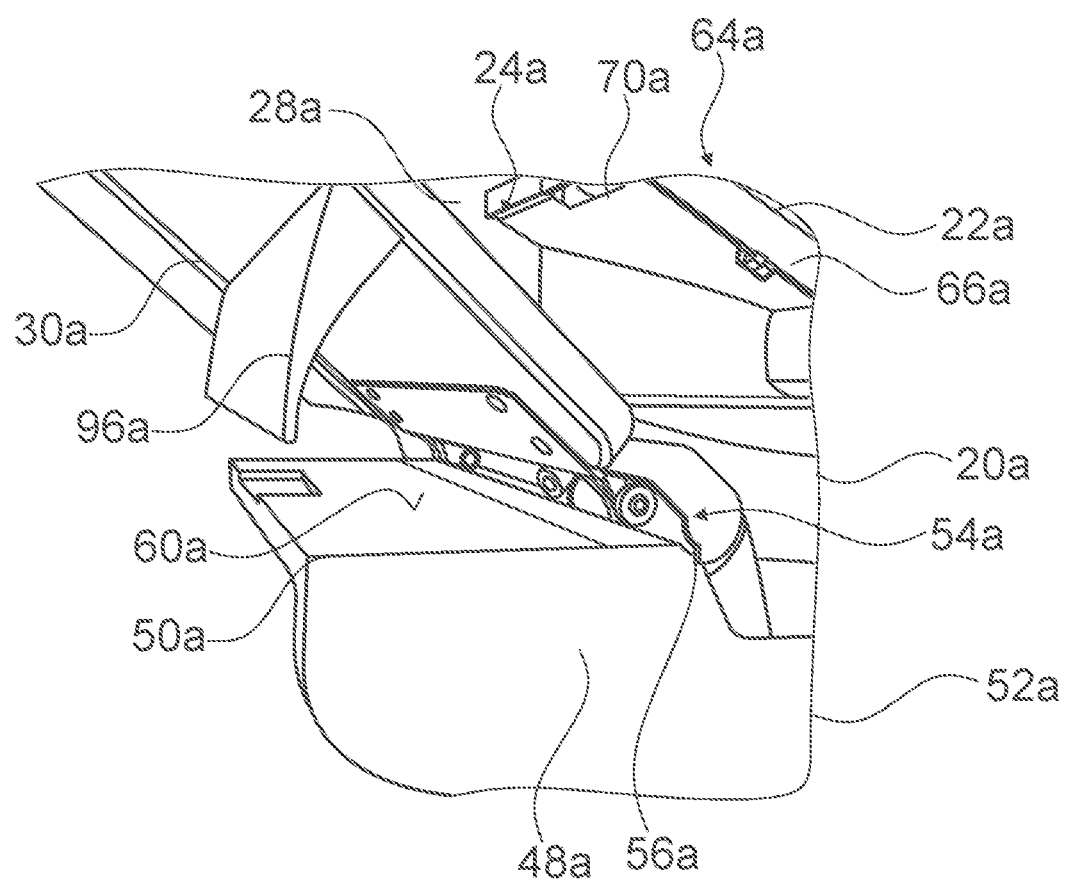
Figure 7:
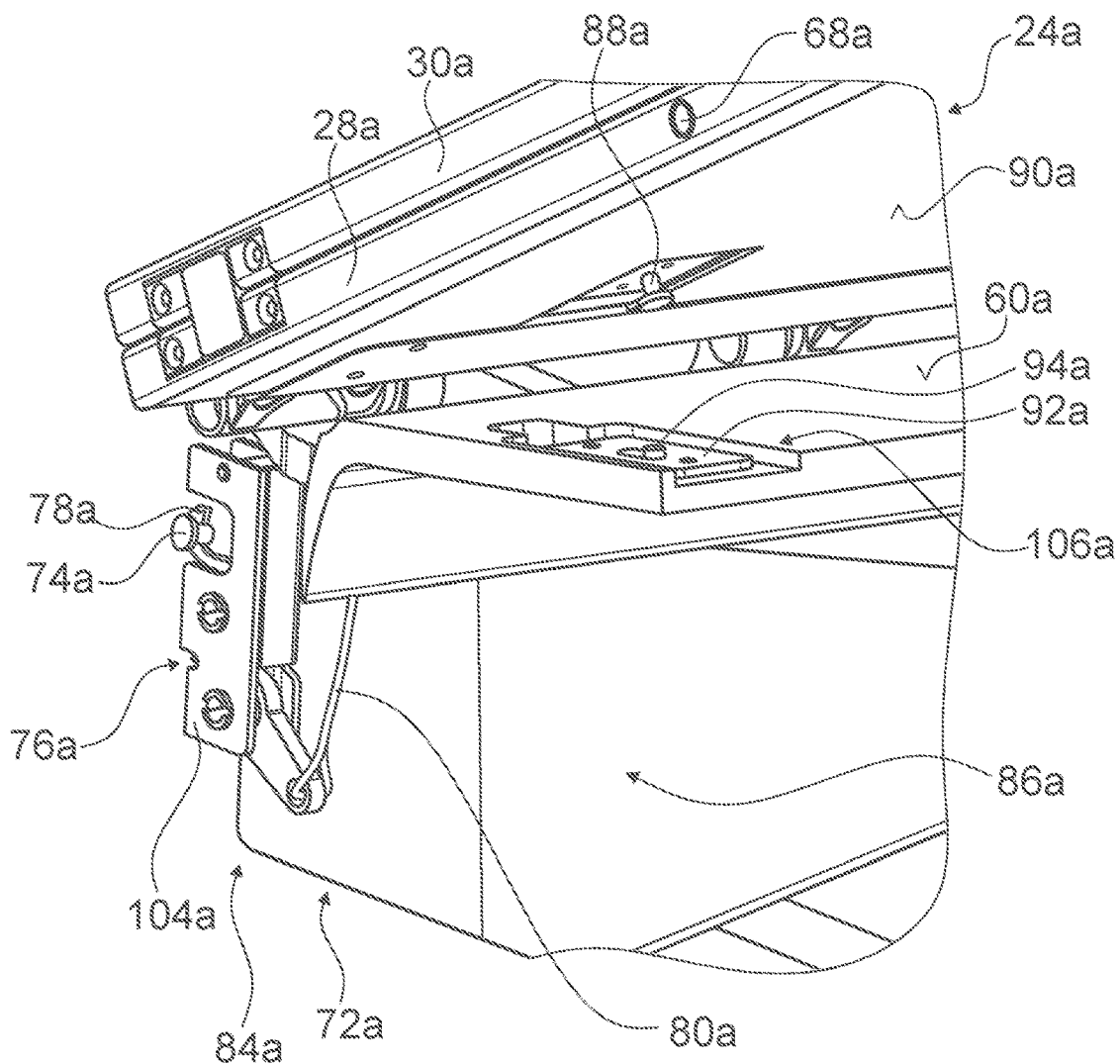
Figure 8:
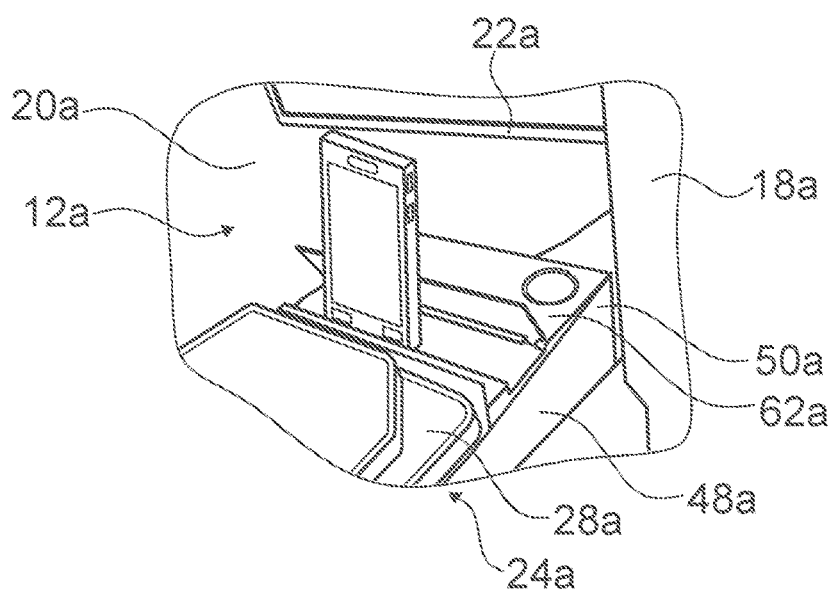
Figure 9:
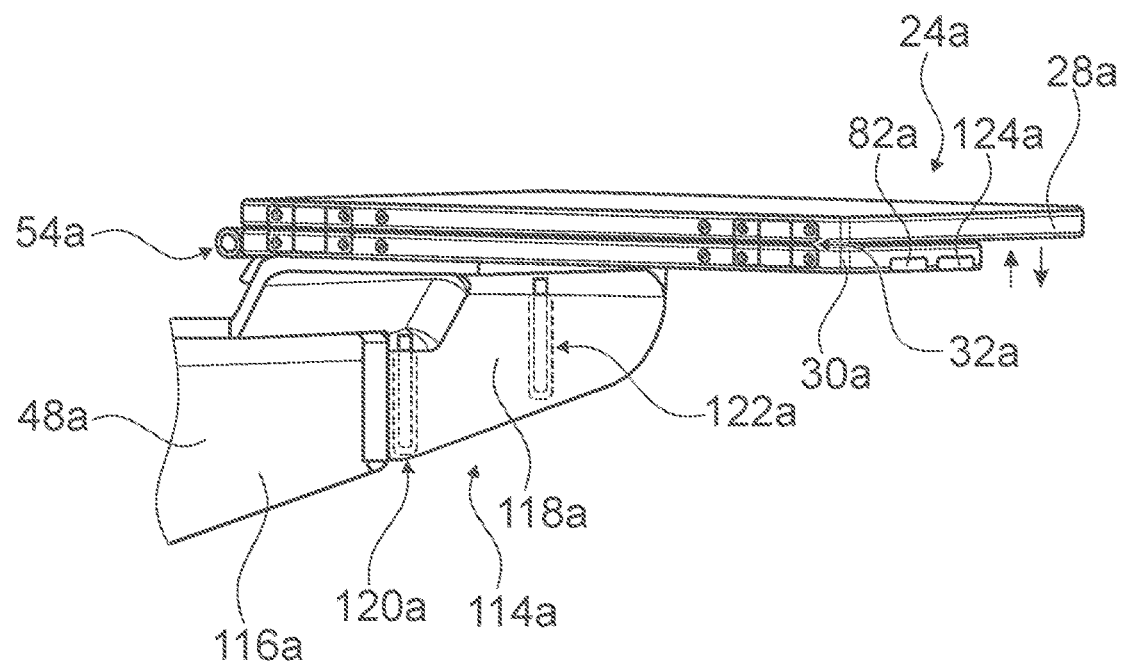
Figure 10:
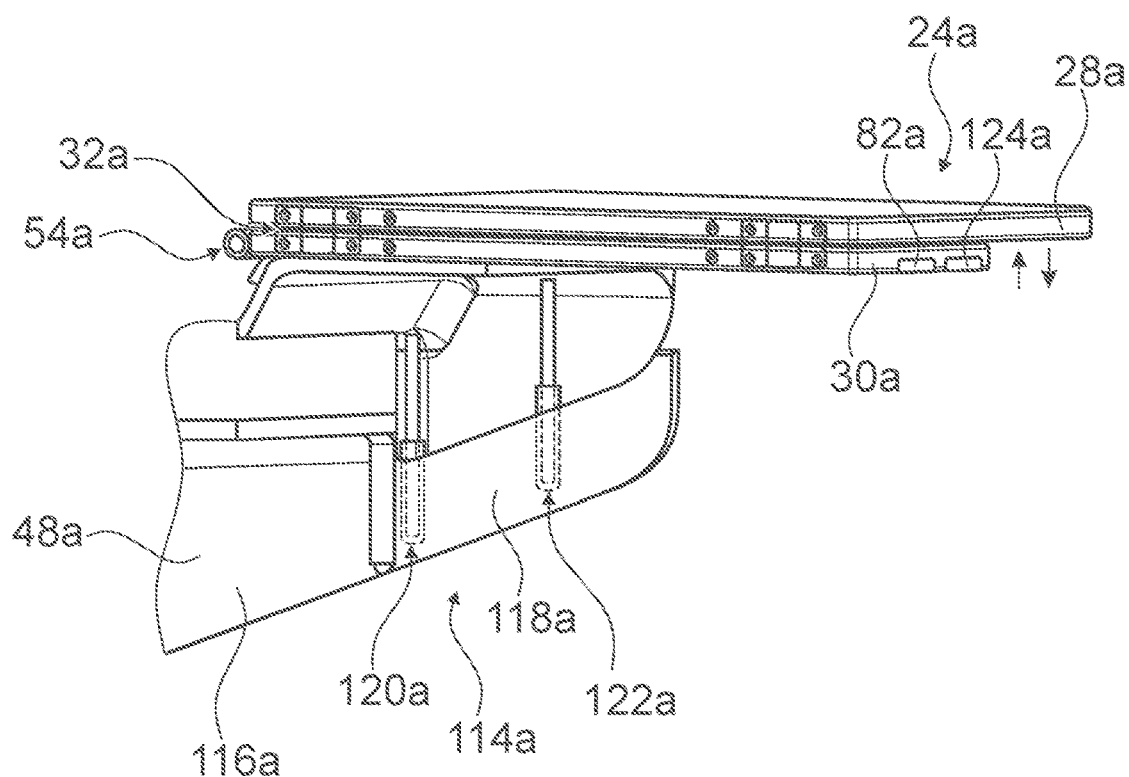
Figure 11:
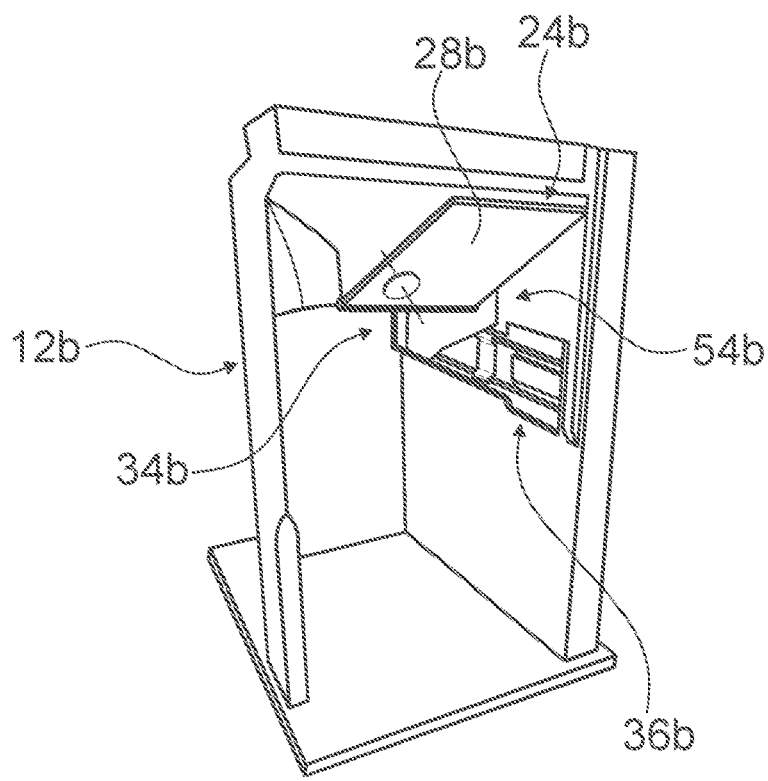
Figure 12:
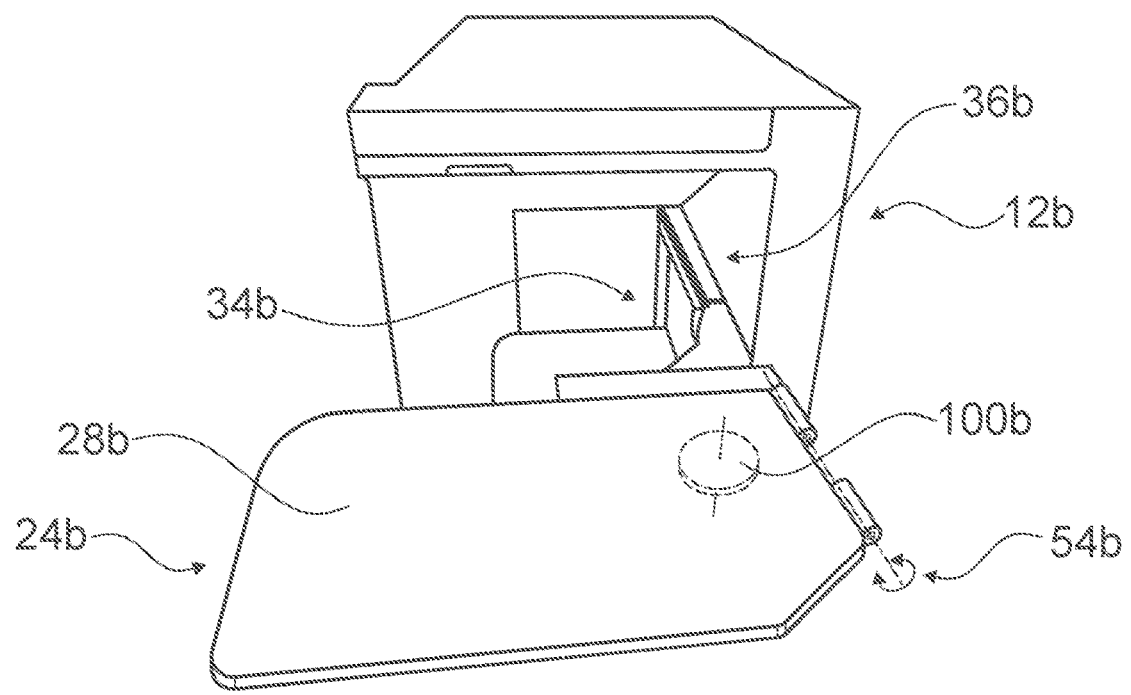

It is shown in:

FIG. 1 a schematic representation of an aircraft seat device according to the invention with a shell element and with a table unit supported thereon in a stowage position, in a first exemplary embodiment, FIG. 2 a schematic representation of the aircraft seat device with the table unit, in an intermediate position, FIG. 3 a schematic representation of the aircraft seat device with the table unit in a partially deployed position in a folded state of the table unit, FIG. 4 a schematic representation of the aircraft seat device with the table unit in a usage position close to the seat, FIG. 5 a schematic representation of the table unit with a support device which supports the table unit movably, FIG. 6 a schematic partial view of the table unit with a portion of a support arm that forms a support surface, FIG. 7 a schematic view of a locking unit for a locking of the table unit in the intermediate position, FIG. 8 a schematic view of a supplemental element which is arranged on the support arm, FIG. 9 a schematic partial view of the table unit with a level adjusting unit, FIG. 10 a schematic partial view of the table unit in a state when adjusted upwards by means of the level adjusting unit, FIG. 11 a schematic representation of an aircraft seat device according to the invention with a shell element and with a table unit supported thereon in a stowage position, in a second exemplary embodiment, and FIG. 12 a schematic view of the table unit in a usage position.

DESCRIPTION OF THE EXEMPLARY EMBODIMENTS

FIGS. 1 to 10 show a first exemplary embodiment of an aircraft seat device. The aircraft seat device is part of an aircraft seat region. The aircraft seat region is preferably implemented as a business-class or first-class flight passenger seat region. the aircraft seat region is in particular arranged in an aircraft seat cabin. The flight passenger seat region comprises an aircraft seat. The aircraft seat is preferably implemented as a business-class or first-class aircraft seat. The aircraft seat will not be described here in detail. The aircraft seat is in particular realized as an aircraft seat known from the prior art, which is preferably in particular traversable into an essentially planar lying-down position. Preferably, the aircraft seat is in particular realized as a full-flat aircraft seat. For this purpose the aircraft seat comprises a seat bottom. The aircraft seat comprises a pivotable backrest. The backrest is preferably capable of being brought into a substantially horizontal position. The aircraft seat comprises a mounting unit, via which the aircraft seat is mounted on a mounting plane, which is preferably implemented by a cabin floor of the aircraft cabin.

The aircraft seat device comprises a shell element 12a. The shell element 12a is part of the aircraft seat region. The shell element 12a preferably at least partially forms an ottoman 14a. The ottoman 14a is in particular configured to provide a foot deposition surface which, in particular in a lying-down position of the aircraft seat, augments a lying-down surface of the aircraft seat. The shell element 12a is in particular arranged in front of the aircraft seat. Preferably the shell element 12a is arranged next to a further aircraft seat that is arranged in front of the aircraft seat. The shell element 12a forms a hollow 16a that faces toward the aircraft seat. The hollow 16a forms a space which the ottoman 14a is arranged in. The hollow 16a is formed by a first side wall 18a, a second side wall 20a and an upper wall 22a of the shell element 12a. The upper wall 22a closes the hollow 16a off towards a top region. Preferably the upper wall 22a is implemented so as to be inclined. In particular, the upper wall 22a has at a front end that faces toward the aircraft seat a greater distance to the cabin floor than at a rear end that faces away from the aircraft seat. The shell element 12a preferably comprises at least one monitor screen 126a above the hollow 16a, which the ottoman 14a is arranged in. The monitor screen 126a is in particular configured to be used by the passenger sitting on the aircraft seat.

The aircraft seat device comprises a table unit 24a. The table unit 24a is connected to the shell element 12a. The table unit 24a is in particular configured, in at least one position, to provide a table surface 26a, that is in particular a deposition surface, for a passenger sitting on the aircraft seat. The table unit 24a is preferably embodied in a two-part implementation. Preferably the table unit 24a comprises a table base body 28a. The table base body 28a is implemented by a flat planar plate. The table base body 28a preferably forms a part of the table unit 24a via which the table unit 24a is connectable to other elements, like in particular the shell element 14a. The table base body 28a forms a first part of the table surface 26a. The table unit 24a comprises a table body 30a, which is arranged at the table base body 28a. The table body 30a is implemented by a flat planar plate. Preferably the table body 30a has at least a same thickness as the table base body 28a. Preferably the table body 30a is arranged pivotably at the table base body 28a. Principally it would also be conceivable that the table body 30a is connected to the table base body 28a in such a way that it is linearly displaceable, for example telescope-wise extractable. Preferably the table body 30a is implemented so as to be pivotable in a transverse direction relative to the table base body 28a. The table unit 24a comprises a pivot bearing unit 32a, by which the table body 30a is supported pivotably relative to the table base body 28a. The pivot bearing unit 32a is preferably implemented by two separate hinge elements, which are in particular arranged spaced apart from each other between the table base body 28a and the table body 30a. The two hinge elements of the pivot bearing unit 32a form a common pivot axis. Principally it is also conceivable that the pivot bearing unit 32a comprises only one hinge element, which is in particular implemented in an elongate fashion and which preferably extends over a large portion of a width of the table base body 28a, respectively the table body 30a. By means of the pivot bearing unit 32a, the table body 30a is pivotable by 180 degrees relative to the table base body 28a. The pivot bearing unit 32a is preferably implemented in a dampened manner, such that in particular an unfolding of the table body 30a from the table base body 28a is realized in a dampened manner. In a folded state, the table body 30a lies with its upper side upon an upper side of the table base body 28a. Herein it is principally conceivable that in the folded state, in at least one position of the table unit 24a, the upper side of the table body 30a is implemented as a second table surface 26a which is usable by a passenger. In a deployed state the table body 30a is arranged next to the table base body 28a. In the deployed state the table body 30a augments the table surface 26a with its upper side. In the deployed state the table base body 28a and the table body 30a are aligned with their upper sides in a planar fashion relative to each other. In the deployed state the upper sides of the table body 30a and the table base body 28a form a planar surface, which forms the table surface 26a. Principally it would also be conceivable that the table unit 24a comprises further table bodies 30a, which are arranged movably on the table base body 28a and/or on the table body 30a and which could augment the table surface 26a in at least one state.

The aircraft seat device comprises a support device 34a, which is configured to support the table unit 24a movably. The support device 34a is configured to support the table unit 24a movably relative to the shell element 14a. The table unit 24a is connected to the shell element 14a via the support device 34a. Preferably, the support device 34a is in particular configured to adjust the table unit 24a between a stowage position and a usage position. Preferably the support device 34a is configured to adjust the table unit 24a into an intermediate position that is situated between a stowage position and a usage position. In the intermediate position the table unit 24a is aligned preferably substantially in a horizontal plane. The horizontal plane is herein aligned substantially parallel to the mounting plane.

In the stowage position the table unit 24a is mounted obliquely to the shell element 14a. The support device 34a is configured to connect the table unit 24a obliquely to the shell element 14a in the stowage position. The table unit 24a is in the stowage position folded to the upper wall 22a of the shell element 14a. Preferably, in the stowage position the table unit 24a at least partially abuts on the upper wall 22a of the shell element 14a. In the stowage position the table unit 24a is in its folded-in state. In the stowage position the table base body 28a and the table body 30a are in their folded-in state. The table unit 24a is transferable into the stowage position only in its folded-in state. The table unit 24a in particular abuts on the upper wall 22a of the shell element 14a with the underside of the table body 30a. In the stowage position the table unit 24a is oriented obliquely to the cabin floor. In particular, the table unit 24a is oriented neither parallel nor orthogonally to the cabin floor, i.e. to a mounting plane. The table unit 24a is in the stowage position in particular pivoted by an angle of at least 20 degrees out of a horizontal plane that is aligned parallel to the cabin floor. The table unit 24a has in the stowage position preferably an angle of 20 degrees relative to the mounting plane. Advantageously the table unit 24a has an angle relative to the mounting plane that is between 10 degrees and 45 degrees.

In the usage position the table unit 24a has preferably been moved away from the shell element 14a. In the usage position the table unit 24a is in particular attached in a region of the aircraft seat. In the usage position, in particular in the completely deployed usage position that is close to a seat, the table unit 24a is arranged at least partially above the aircraft seat. In the completely deployed usage position that is close to a seat, the table unit 24a is arranged above the aircraft seat such that a passenger sitting on the aircraft seat is enabled to use the table comfortably, for example for eating or for depositing a laptop computer. In the usage position the table unit 24a is preferably in an unfolded state, such that the entire table surface 26a is usable.

The support device 34a is configured, in an adjustment of the table unit 24a between the stowage position and the usage position, to traverse the table unit 24a into the intermediate position. The intermediate position is implemented as a position of the table unit 24a between the stowage position and the usage position. In an adjustment of the table unit 24a from the stowage position into the usage position or from the usage position into the stowage position, the table unit 24a is always firstly traversed into the intermediate position by the support device 34a. In the intermediate position the table unit 24a is aligned substantially in a horizontal. In the intermediate position the table unit 24a forms a planar deposition surface. The table unit 24a is in the intermediate position in particular in its folded state, the table body 30a being in particular folded to the table base body 28a. In the intermediate position the table unit 24a cannot be transferred into its unfolded state. In particular, the table unit 24a can be adjusted into the intermediate position only when it is in its folded-in state. In an adjustment from the stowage position into the intermediate position and vice versa, the table unit 24a is preferably merely pivoted. In an adjustment from the usage position into the intermediate position and vice versa, the table unit 24a is preferably configured to be merely displaced axially.

For an adjustment of the table unit 24a, the support device 34a comprises at least one linear bearing unit 36a. The linear bearing unit 36a is in particular configured for an adjustment of the table unit 24a between the intermediate position and the usage position. The linear bearing unit 36a realizes a maximally retracted position. In the maximally retracted position of the linear bearing unit 36a, the table unit 24a is arranged in the intermediate position or in the stowage position. The linear bearing unit 36a realizes a maximally deployed position. In the maximally deployed position, the table unit 24a is arranged in the usage position close to a seat. The linear bearing unit 36a is in particular configured to support the table unit 24a such that it is axially displaceable relative to the shell element 14a along a movement path. The linear bearing unit 36a forms a bearing axis 38a, which is implemented obliquely to the mounting plane. The bearing axis 38a is preferably inclined downward towards the aircraft seat, i.e. toward the mounting plane. Preferably, the bearing axis 38a in particular includes an angle of eight degrees relative to the mounting plane. Principally it is also conceivable that the bearing axis 38a includes an angle of zero degrees to fifteen degrees with the mounting plane. The linear bearing unit 36a is in particular configured, in an axial displacement toward the aircraft seat, for lowering the table unit 24a toward the mounting plane. Because of this, the table unit 24a has, in its completely deployed usage position close to a seat, a particularly ergonomic level whereas in the intermediate position and in the stowage position the table unit 24a is arranged advantageously high up in order to ensure sufficient leg space in the region of the ottoman 14a. The linear bearing unit 36a preferably comprises two parallel-running guiding rails 40a, 42a, which are inserted in the side wall 18a. The guiding rails 40a, 42a are fixedly connected with the side wall 18a. The guiding rails 40a, 42a are arranged spaced apart from each other in a vertical direction. The guiding rail 40a is arranged below the guiding rail 42a. The guiding rails 40a, 42a define the bearing axis 38a of the linear bearing unit 36a. The linear bearing unit 36a comprises per each guiding rail 40a, 42a one guiding element 44a, 46a. The first guiding element 44a is coupled with the guiding rail 40a. The other guiding element 46a is coupled with the guiding rail 42a. The guiding elements 44a, 46a are in each case supported on the corresponding guiding rail 40a, 42a such that they are axially displaceable. Preferably, the guiding elements 44a, 46a are in particular supported on the guiding rails 40a, 42a via a slide bearing. Principally it is also conceivable that at least one guiding element 44a, 46a or both guiding elements 44a, 46a is/are supported on the corresponding guiding rail 40a, 42a so as to be displaceable via a roller bearing. Principally it is also conceivable that the linear bearing unit 36a comprises a brake unit, which is configured to at least delay a linear displacement of the table unit 24a via the linear bearing unit 36a at least in a region that is close to a seat. Principally it is also conceivable that the linear bearing unit 36a comprises a supporting unit that comprises at least one energy storage and is in particular configured to initially support a linear movement of the table unit 24a from a usage position into the intermediate position. Preferably it is also conceivable that the linear bearing unit 36a comprises a blocking unit, which is configured to fixate the table unit 24a in different positions between the intermediate position and the usage position that is close to a seat. Preferably, it is in particular conceivable that for a blocking of the table unit 24a, the blocking unit comprises spring-load pieces which are capable of latching into different latch elements, or comprises a brake element which fixates the table unit 24a in different positions on the guiding rails 40a, 42a in a positionally secure manner.

The support device 34*a* comprises a support arm 48*a*. The support arm 48*a* is configured to connect the table unit 24*a* to the shell element 12*a*. The support arm 48*a* is preferably arranged between the linear bearing unit 36*a* and the pivot bearing unit 32*a*. The support arm 48*a* is preferably configured to be connected to the shell element 12*a* in such a way that the support arm 48*a* is axially displaceable via the linear bearing unit 36*a*. The support arm 48*a* is linearly traversable along the bearing axis 38*a* by means of the linear bearing unit 36*a*. The support arm 48*a* is realized as a substantially L-shaped component. The support arm 48*a* has a first side 50*a* and a second side 52*a*. The second side 52*a* is oriented substantially orthogonally to the first side 50*a*. Preferably the first side 50*a* is realized as a long side of the support arm 48*a*. The second side 52*a* is preferably realized as a short side of the support arm 48*a*. The first side 50*a* of the support arm 48*a* faces toward the shell element 12*a*, in particular the side wall 18*a*. In a mounted state the first side 50*a* of the support arm 48*a* extends substantially parallel to the side wall 18*a* of the shell element 12*a*. The support arm 48*a* is coupled with the shell element 12*a* in a rear end region of its first side 50*a*. In a mounted state, the rear end region of the first side 50*a* of the support arm 48*a* faces away from the aircraft seat. For a connection of the support arm 48*a* to the guiding rails 40*a*, 42*a* of the linear bearing unit 36*a*, the guiding elements 44*a*, 46*a* are fixedly mounted in the rear region of the first side 50*a* of the support arm 48*a*. An underside of the support arm 48*a* is preferably implemented so as to be oblique. Preferably the support arm 48*a* has in its rear region a smaller distance to the mounting plane than in a frontward region. In this way leg space can be augmented, in particular in a region facing toward the passenger.

The table unit 24*a* is preferably connected to the support arm 48*a*. The table unit 24*a* is connected to the support arm 48*a* in a pivotable manner. For the pivotable connection of the table unit 24*a*, the support device 34*a* comprises a rotational bearing unit 54*a*. The rotational bearing unit 54*a* is configured for a pivoting of the table unit 24*a* between the stowage position and at least the intermediate position that is situated substantially in the horizontal plane. The rotational bearing unit 54*a* is preferably configured only for an adjustment of the table unit 24*a* between the stowage position and the intermediate position. The rotational bearing unit 54*a* is in particular configured to support the table unit 24*a* such that it is pivotable relative to the support arm 48*a*. The rotational bearing unit 54*a* preferably comprises two hinge elements 56*a*, 58*a*. The hinge elements 56*a*, 58*a* are arranged at a rear end of the second side 52*a* of the support arm 48*a*. The hinge elements 56*a*, 58*a* form a pivot axis 102*a*. The table unit 24*a* is pivotable, relative to the support arm 48*a* of the support device 34*a*, around the pivot axis 102*a*. The hinge elements 56*a*, 58*a* are fixedly connected in each case with a first end to the support arm 48*a*, in particular fixedly connected to a rear end of the second side 52*a* of the support arm 48*a*. With a second end, the hinge elements 56*a*, 58*a* are in each case fixedly connected to the table unit 24*a*. Preferably the hinge elements 56*a*, 58*a* are in each case fixedly connected to the table base body 28*a* of the table unit 24*a*. Preferably, the hinge elements 56*a*, 58*a* are in particular fixedly connected to a rear end of the table base body 28*a* of the table unit 24*a*. The hinge elements 56*a*, 58*a* are preferably embodied as dampened hinges. Preferably, the hinge elements 56*a*, 58*a* embodied as dampened hinges are in particular configured for dampening a movement of the table unit 24*s* during a downward pivoting, i.e. a pivoting out of the stowage position into the intermediate position. In this way, in particular a gentle folding-down of the table unit 24*a* from the stowage position into the intermediate position is achievable. In a pivoting from the intermediate position into the stowage position, the hinge elements 56*a*, 58*a* are configured to do no dampening. The hinge elements 56*a*, 58*a* are preferably embodied as one-way torque-producing rotary hinges (one-way hinges). It would principally also be conceivable that the rotational bearing unit 54*a* comprises only one hinge element. Preferentially it is as well conceivable that the rotational bearing unit 54*a* comprises a dampening unit that is realized separately from the hinge elements 56*a*, 58*a* and is configured to dampen the pivoting movement of the table unit 24*a*. The separately embodied dampening unit comprises a spring element. The spring element is implemented as a torsion spring. The spring element that is implemented as a torsion spring is preferably arranged centrally between the two hinge elements 56*a*, 58*a*. The spring element is preferably attached to the table unit 24*a*. For a connection of the dampening unit, the table unit 24*a* forms a connection region. The connection region is realized by two spaced-apart holding elements, each of which comprises a fixation opening. The fixation openings are preferably implemented to be circular. Respectively one counterholder element is inserted in the fixation openings. For a proper positioning, the counterholder elements can be turned in the fixation openings. The counterholder elements are fixatable in the respective fixation opening in a positionally and rotationally fixed manner by means of screw elements, preferably grub screws. The counterholder elements each comprise a support region, which the spring element may be supported on with a support region that faces toward the table unit 24*a*. With a second support region, the spring element that is implemented as a rotational spring is supported on the support arm 48*a*. A pivoting of the table unit 24*a* from the stowage position into the intermediate position can be dampened by means of the spring element of the dampening unit. An adjustment from the intermediate position into the stowage position is preferably supported by the spring element of the dampening unit.

The support arm 48*a* forms a support surface 60*a*. The support surface 60*a* is configured in such a way that the table unit 24*a* is at least partly supported thereon in the usage position. The support surface 60*a* is formed by an upper side of the support arm 48*a*, preferably mainly by the second side 52*a* of the support arm 48*a*. The support surface 60*a* is realized as a substantially planar surface. The support surface 60*a* forms an abutment for the table unit 24*a*, which the table unit 24*a* lies upon in the intermediate position and in the usage position. The table unit 24*a* lies upon the support surface 60*a* in a position when the table unit 24*a* has been folded downwards by means of the rotational bearing unit 54*a*. Preferably, the table unit 24*a* lies upon the support surface 60*a* in particular with an underside 90*a* of the table base body 28*a*. Principally it is also conceivable that the table unit 24*a* is implemented in such a way that both the underside 90*a* of the table base body 28*a* and an underside of the table body 30*a* lie upon the support surface 60*a* in a folded-down state. The support surface 60*a* is in particular configured such that forces introduced into the table unit 24*a* can be transferred into the support arm 48*a* via the support surface 60*a*. Operative forces, for example weight forces of objects deposited on the table unit 24*a*, which act onto the table unit 24*a*, are supported by the support surface 60*a* and are thus at least partly transferred into the support arm 48*a*. By operative forces being supported into the support arm 48a via the support surface 60a, an especially stable support of the table unit 24a is enabled.

The support arm 48a forms a supplemental element 62a. The supplemental element 62a is in particular arranged in a region of the support arm 48a that is located behind the table unit 24a. The supplemental element 62a is in particular arranged in a region of the first side 50a of the support arm 48a which directly adjoins the table unit 24a. The supplemental element 62a is in particular arranged in a transition region from the first side 50a to the second side 52a of the support arm 48a. The supplemental element 62a is preferably implemented as a tablet holder and/or cellphone holder. The supplemental element 62a that is implemented as a tablet holder and/or cellphone holder comprises a holding device in which a cellphone or a tablet can be securely held and/or clamped in a usage position. Principally it is also conceivable that the supplemental element 62a is implemented as a stowage element. The stowage element forms a stowage space, which can be preferably closed or opened by means of a closure element. For example, rather small items, e.g. a smartphone or other items, can be stored in the supplemental element 62a that is implemented as a stowage element. Alternatively, the supplemental element 62a may also be implemented in a different manner, for example as a cup holder or as an additional small deposition surface. Principally it is also conceivable that the supplemental element 62a is realized as a supply element having, for example, power, audio or USB terminals.

The support device 34a comprises a locking module 64a. The locking module 64a is configured for securing the table unit 24a in the stowage position. The locking module 64a is in particular configured for securing the table unit 24a on the shell element 12a in the stowage position. The locking module 64a is configured for locking the table unit 24a in the stowage position in an operatively secure manner, such that in particular the table unit 24a cannot be moved out of the stowage position inadvertently. The locking module 64a is configured for locking the table unit 24a in the stowage position in a form-fit manner. The locking module 64a is preferably configured for locking the table unit 24a automatically, i.e. autonomously, when the table unit 24a is moved into the stowage position. The locking module 64a has a locking position and an unlocking position. In the locking position of the locking module 64a the table unit 24a can be secured in the stowage position. In the unlocking position of the locking module 64a the table unit 24a is released and can be moved out of the stowage position. The locking module 64a comprises a securing element 66a. The securing element 66a is realized as a securing pin. The securing element 66a is supported movably in the shell element 12a. Preferably the securing element 66a is supported sideways movably in the side wall 20a. In the locking position of the locking module 64a, the securing element 66a is deployed out of the side wall 20a. In the locking position the securing element 66a projects from the shell element 12a. The table unit 24a comprises a form-fitting element 68a, which is configured such that for securing the table unit 24a the securing element 66a engages into the form-fitting element 68a in a form-fit manner. The form-fitting element 68a is implemented as a hole. The form-fitting element 68a is introduced into the table unit 24a sideways. The form-fitting element 68a is preferably introduced in a side of the table unit 24a that faces toward the side wall 20a. The form-fitting element 68a is in particular introduced sidewise into the table base body 28a of the table unit 24a. Principally it is also conceivable that the form-fitting element 68a is arranged on the underside of the table unit 24a, in particular on the underside 90a of the table base body 28a. Principally it is in particular also conceivable that the securing element 66a is arranged on the table unit 24a, for example on the underside 90a of the table base body 28a, and the form-fitting element 68a is introduced in the shell element 12a, in particular in the side wall 20a. In the stowage position the securing element 66a engages into the form-fitting element 68a in a form-fit manner, thus holding the table unit 24a in the stowage position. In the stowage position the securing element 66a engages in the table unit 24a sideways in a form-fit manner. In the unlocking position the securing element 66a is arranged at least substantially within the shell element 12a, in particular within the side wall 20a. In the unlocking position the securing element 66a has been moved out of a region of the table unit 24. In the unlocking position the securing element 66a has been moved out of the form-fitting element 68a of the table unit 24a. In the unlocking position a form-fit connection between the securing element 66a and the form-fitting element 68a of the table unit 24a has been undone, which permits an adjustment of the table unit 24a out of the stowage position. The securing element 66a is preferably linearly displaced between the locking position and the unlocking position. The locking position is the neutral position of the locking module 64a. Preferably, if there is no force that acts onto the locking module 64a, in particular no force triggered by a passenger, the locking module 64a automatically gets adjusted into the locking position. In a non-actuated state of the locking module 64a, the securing element 66a is arranged in its locking position. The locking module 64a comprises for this purpose an energy-storage element (not shown in detail), like preferentially a spring element, which pushes the securing element 66a toward its locking position. The securing element 66a has on its end facing towards the table unit 24a a sloped surface, via which the table unit 24a can deflect the securing element 66a when pivoting into the stowage position, thus allowing the securing element 66a to engage into the form-fitting element 68a of the table unit 24a in a form-fit manner.

The locking module 64a comprises an actuation member 70a. The actuation member 70a is configured for an actuation of the locking module 64a. The actuation member 70a is preferably configured to be actuated by a person, preferably by a passenger sitting on the aircraft seat. The actuation member 70a is implemented as an actuation lever. The actuation member 70a that is implemented as an actuation lever is configured to be gripped by an operator and to be moved, preferably pivoted, between a rest position (neutral position) and an actuation position. The actuation member 70a is coupled with the securing element 66a. If the actuation member 70a is in its rest position, the securing element 66a is in its locking position. In the actuation position of the actuation member 70a, the securing element 66a is moved into its unlocking position. By operating the actuation member 70a, an operator is able to actuate the locking module 64a, in particular to adjust the locking module 64a between its locking position and its unlocking position. In particular, an operator can move the table unit 24a out of its stowage position by operating the actuation member 70a of the locking module 64a. If the table unit 24a is in its stowage position and is secured by the locking module 64a and an operator unlocks the locking module 64a by actuating the actuation member 70a, the table unit 24a automatically traverses from the stowage position into the intermediate position due to its weight force. The actuation member 70a is arranged in the shell element 12a. Preferably, in particular on a side of the shell element 12a that faces toward the aircraft seat, the actuation member 70a is arranged on a level with the folded table unit 24a. Preferentially the actuation member 70a is connected to the shell element 12a sidewise next to the table unit 24a.

The support device 34a comprises a locking unit 72a. The locking unit 72a is configured for locking the table unit 24a in the intermediate position. The locking unit 72a is in particular configured such that, when the table unit 24a is adjusted into the intermediate position, the table unit 24a is initially locked. The locking unit 72a is configured to lock at least the linear bearing unit 36a when the table unit 24a is arranged in the intermediate position. The locking unit 72a comprises a form-fitting element 74a, which is fixedly connected to the shell element 12a. The form-fitting element 74a is preferably implemented as a stationary fixation bolt. The form-fitting element 74a is arranged on an inner side of the side wall 18a. The form-fitting element 74a is in particular arranged at a rear end of the linear bearing unit 36a, preferably at a rear end of the guiding rails 40a, 42a. The form-fitting element 74a that is implemented as a stationary fixation bolt preferably protrudes from the side wall 18a inwards in a region behind the two guiding rails 40a, 42a of the linear bearing unit 36a. Preferably the form-fitting element 74a protrudes beyond the guiding rails 40a, 42a. The locking unit 72a comprises a snap mechanism 76a. The snap mechanism 76a is configured for a coupling with the form-fitting element 74a. The snap mechanism 76a is fixedly connected to the support arm 48a. Preferably, the snap mechanism 76a is in particular arranged at a rear end of the first side 50a of the support arm 48a. The snap mechanism 76a preferably comprises a form-fitting element 78a, which is implemented correspondingly to the form-fitting element 74a that is implemented as a fixation bolt. The form-fitting element 78a of the snap mechanism 76a is implemented as a pivotable hook element. The snap mechanism 76a comprises a housing 104a, in which the form-fitting element 78a that is implemented as a hook element is supported in a pivotable manner. The form-fitting element 78a that is implemented as a hook is deflectable out of its locking position by a spring force. In its locking position the form-fitting element 78a that is implemented as a hook is capable of engaging around the form-fitting element 74a that is implemented as a fixation bolt. The form-fitting element 78a that is implemented as a hook element is capable of engaging around the form-fitting element 74a that is implemented as a fixation bolt if the linear bearing unit 36a is arranged in its maximally retracted position. The form-fitting element 78a that is implemented as a hook can be operated via a transfer element 80a. The transfer element 80a is embodied as a Bowden cable. The transfer element 80a that is embodied as a Bowden cable is coupled with the form-fitting element 78a that is implemented as a hook. In FIG. 5 the transfer element 80a that is embodied as a Bowden cable is illustrated just schematically. By an actuating movement of the transfer element 80a, the form-fitting element 78a that is implemented as a hook can be brought from its locking position into its unlocking position. If the form-fitting element 78a that is implemented as a hook is in its unlocking position, the linear bearing unit 36a is released and the support arm 48a with the table unit 24a that is fixated thereon is linearly displaceable along the bearing axis 38a. If the table unit 24a is displaced from a usage position back into its intermediate position by means of the linear bearing unit 36a, the form-fitting element 78a of the snap mechanism 76a that is implemented as a hook automatically latches behind the form-fitting element 74a that is implemented as a holding pin, thus locking the locking unit 72a autonomously. The table unit 24a is automatically re-locked in the intermediate position.

The locking unit 72a comprises an actuation element 82a, by means of which the locking unit 72a can be unlocked. The actuation element 82a is embodied as an actuation lever. The actuation element 82a is arranged in the table unit 24a. Preferably the actuation element 82a is integrated in the table unit 24a on a front end of the table base body 28a. The actuation element 82a that is embodied as an actuation lever is configured to be pivoted around a horizontally-extending pivot axis. The actuation element 82a is configured, for an actuation, to be gripped by an operator and to be pivoted, preferably pivoted upwards, around its pivot axis. The actuation element 82a is preferably mechanically coupled with the transfer element 80a of the snap mechanism 76a. For a mechanical coupling of the actuation element 82a with the transfer element 80a, the locking unit 72a comprises a mechanism 128a, which is not specified in detail. The mechanism 128a preferably extends in an interior of the table unit 24a, in particular in the table base body 28a. Due to the coupling, the snap mechanism 76a, which means in particular the locking unit 72a, can be actuated by means of the actuation element 82a. As a result of an actuation of the actuation element 82a by a user in the intermediate position of the table unit 24a, the locking unit 72a can be unlocked and the table unit 24a is hence movable out of its intermediate position. Herein, in particular because of the oblique bearing axis 38a, the table unit 24a traverses into the usage position automatically.

The locking unit 72a comprises a securing unit 84a. The securing unit 84a is configured such that the locking unit 72a is unlockable only if the table unit 24a is arranged completely in the intermediate position. The securing unit 84a is in particular configured to prevent an actuation of the locking unit 72a if the table unit 24a is not arranged in the intermediate position. The securing unit 84a is preferably configured to create an operative connection between the transfer element 80a of the snap mechanism 76a and the actuation element 82a of the locking unit 72a only if the table unit 24a is arranged in the intermediate position. Preferentially the securing unit 84a is in particular configured to interrupt an operative connection between the transfer element 80a of the snap mechanism 76a and the actuation element 82a of the locking unit 72a if the table unit 24a is not arranged in the intermediate position, in particular if the table unit 24a is pivoted toward the stowage position by the rotational bearing unit 54a. For an interruption of the operative connection between the transfer element 80a of the snap mechanism 76a and the actuation element 82a of the locking unit 72a, the securing unit 84a comprises a coupling mechanism 86a. The coupling mechanism 86a is arranged operatively between the transfer element 80a of the snap mechanism 76a and the actuation element 82a of the locking unit 72a. The coupling mechanism 86a is in particular arranged between the table base body 28a of the table unit 24a and the second side 52a of the support arm 48a. The coupling mechanism 86a comprises a table-side coupling element 88a. The table-side coupling element 88a is arranged on the underside 90a of the table base body 28a of the table unit 24a. The table-side coupling element 88a is implemented as a mobile element. In terms of movement, the table-side coupling element 88a is coupled with the actuation element 82a of the locking unit 72a. The table-side coupling element 88a is connected to the actuation element 82a via a transfer element that extends in an interior of the table base body 28a and is not shown in detail. The transfer element is preferably embodied as a Bowden cable. It is principally also conceivable that the transfer element is implemented as a mechanism comprising one or several lever element/s. The coupling element 88a is embodied as a pin element. Preferably the coupling element 88a is in particular embodied as a mushroom-headed pin element. The coupling mechanism 86a comprises a second, support-arm-side coupling element 92a. The support-arm-side coupling element 92a comprises a form-fitting element 94a, which the table-side coupling element 88a, which is embodied as a pin element, can engage in. The support-arm-side coupling element 92a is implemented as an axially displaceable plate, in which the form-fitting element 94a is introduced as a hole. The support-arm-side coupling element 92a is supported displaceably in the support arm 48a. The support-arm-side coupling element 92a is preferably attached in a deepening introduced in the support surface 60a. The support-arm-side coupling element 92a is supported such that it is movable counter to a spring load. In terms of movement, the support-arm-side coupling element 92a is coupled with the transfer element 80a of the snap mechanism 76a. If the table base body 28a of the table unit 24a lies upon the support surface 60a, the table-side coupling element 88a engages in the support-arm-side coupling element 92a. Preferably the table-side coupling element 88a only engages in the support-arm-side coupling element 92a if the table base body 28a lies upon the support surface 60a completely. When the table-side coupling element 88a then engages in the support-arm-side coupling element 92a, the coupling mechanism 86a is in a coupled state. In a coupled state the table-side coupling element 88a engages in the support-arm-side coupling element 92a in a form-fit manner. In the coupled state of the coupling mechanism 86a an operative connection has been created between the actuation element 82a and the transfer element 80a. In particular, in the coupled state of the coupling mechanism 86a a movement of the actuation element 82a is transferable to the transfer element 80a of the snap mechanism 76a.

The support device 34a comprises a usage position securing unit 106a. The usage position securing unit 106a is configured for securing the table unit 24a in the usage position insofar as the table unit 24a is not arranged in the intermediate position. The usage position securing unit 106a is preferably implemented at least partly integrally with the coupling mechanism 86a. The form-fitting element 94a introduced in the support-arm-side coupling element 92a has a key-hole shape. The form-fitting element 94a comprises an insertion portion having a diameter that is larger than the mushroom head of the table-side coupling element 88a that is implemented as a pin element. The form-fitting element 94a comprises a locking portion having a diameter that is smaller than the mushroom head of the table-side coupling element 88a that is implemented as a pin element. The insertion region preferably adjoins the locking region of the form-fitting element 94a directly. If the table unit 24a is arranged in the intermediate position, the coupling element 88a that is implemented as a mushroom-headed pin element is located in the insertion region of the form-fitting element 94a of the coupling element 92a. The table unit 24a is transferable from the intermediate position into the stowage position via the rotational bearing unit 54a. If the table unit 24a is not arranged in the intermediate position, the coupling element 88a that is implemented as a mushroom-headed pin element is located in the locking region of the form-fitting element 94a of the coupling element 92a. Due to its mushroom head, the coupling element 88a is connected to the form-fitting element 94a of the coupling element 92a in a form-fit manner in a pivot direction of the table unit 24a, and the table unit 24a cannot be pivoted via the rotational bearing unit 54a. Principally it is also conceivable that the usage position securing unit 106a is implemented separately from the coupling mechanism 86a, in particular comprising its own mushroom-headed pin and a corresponding form-fitting element.

The table unit 24a comprises a cover element 96a. The cover element 96a is configured to cover a region between the upward-folded table unit 24a and the support arm 48a, in particular the second side 52a of the support arm 48a, toward the aircraft seat. The cover element 96a is in particular meant to prevent a passenger from getting his fingers caught between the table unit 24a and the support surface 60a when folding the table down. The cover element 96a is, for example, implemented as a fin extending from the underside 90a of the table base body 28a downwards. In an upward-folded state of the table unit 24a, in particular if the table unit 24a is arranged in the stowage position, the cover element 96a that is implemented as a fin extends from the underside 90a of the table base body 28a beneath the edge of the support surface 60a of the support arm 48a. In this way, in any position of the table unit, it is possible to prevent a hand being put in between the table unit 24a and the support surface 60a from the front side. Principally it is also conceivable that the cover element 96a is implemented by a textile, by a telescopic element, by a spring element or by a folding element, which is fixedly connected to the underside 90a of the table base body 28a and to a front edge of the support arm 48a. The table unit 24a further comprises at least one abutment element 98a which is configured, in a deployed state of the table unit 24a, to prevent a displacement of the table unit 24a from a usage position into the intermediate position. The abutment element 98a is preferably implemented integrally with the table unit 24a. Preferably, the abutment element 98a is in particular implemented by a rear side of the table body 30a. In a deployed state of the table unit 24a, the abutment element 98a implemented by the rear side of the table body 30a abuts on a side wall 20a of the shell element 12a, thus preventing further displacement of the table unit 24a toward the intermediate position when the table unit 24a is in its deployed state.

The shell element 12a forms a deposition compartment in the upper wall 22a. The deposition compartment 108a is introduced in the wall 22a and extends above the hollow 16a. The deposition compartment 108a comprises a filling opening 110a, which is arranged on a front side of the wall 22a. The filling opening 110a is introduced in the wall 22a between the monitor screen 126a and the folded table unit 24a. The deposition compartment 108a can be filled via the filling opening 110a. The deposition compartment 108a is in particular implemented so as to be oblique. Preferentially, the deposition compartment 108a in particular extends parallel to an underside of the wall 22a of the shell element 12a. The deposition compartment 108a in particular has at its rear end a smaller distance from the mounting plane than at its front end, which the filling opening 110a is arranged in. As a result, objects, for example laptops or tablets, slide into the deposition compartment 108a and are thus securely stowed in the deposition compartment 108a and cannot drop out easily. Principally it is also conceivable that the deposition compartment 108a comprises a closure element, for example a flap, by means of which the filling opening 110a of the deposition compartment 108a is closable. Preferably, the deposition compartment 108a has on its lower end a removal slot 112a, via which in particular small objects can be removed from the deposition compartment 108a at a lower end, in particular if the table unit 24a is not arranged in the stowage position. The removal slot 112a is introduced in the underside of the wall 22a. The removal slot 112a opens into the hollow 16a of the shell element 12a.

The support device 34a comprises a level adjustment unit 114a. The level adjustment unit is configured for an adjustment of a level of the table unit between a minimum level and a maximum level in the usage position, in particular in the usage position close to a seat. By means of the level adjustment unit 114a, an operator, in particular a passenger sitting on the aircraft seat, can adjust a level of the table unit 24a manually between the minimum level and the maximum level. This enables a passenger to individually adjust the level of the table unit 24a to his requirements. For a realization of the level adjustment unit 114a, the support arm 48a is implemented in two parts in a subregion, preferably in particular on the second side 52a. A first arm element 116a is rigidly connected to the first side 50a of the support arm 48a. A second arm element 118a is connected to the first element 116a, which is fixedly connected to the first side, in such a way that the second arm element 118a is linearly adjustable, in particular linearly adjustable in a vertical direction. The two arm elements 116a, 118a are connected to each other so as to be linearly displaceable. For a connection oft the two arm elements 116a, 118a, the level adjustment unit 114a comprises two linear bearings 120a, 122a. The two linear bearings 120a, 122a in each case comprise a guiding element that is connected to the first arm element and a guiding element that is connected to the second arm element 118a, said guiding elements engaging into each other in a form-fit manner and being adjustable relative to each other along an adjustment direction, which is in particular oriented in a vertical direction. The table unit 24a is connected to the second arm element 118a. In this way the table unit 24a is adjustable in its level by means of the level adjustment unit 114a via an axial displacement of the two arm elements 116a, 118a relative to each other. Preferably the table unit 24a can be blocked by the level adjustment unit 114a at different levels and can preferably in particular be adjusted continuously. The level adjustment unit 114a preferably comprises a securing unit. The securing unit is configured such that the table unit 24a can be adjusted in its level by means of the level adjustment unit 114a when the table unit 24a is arranged in a usage position. Preferably the securing unit is configured such that the table unit is displaceable from a usage position into the intermediate position only if the table unit is arranged at its minimum level. For operating the level adjustment unit 114a, the support device 34a comprises an operating element 124a. Principally it would also be conceivable that the operating element for operating the level adjustment unit 114a is implemented integrally with the actuation element 82a of the locking unit 72a, or that the level adjustment unit 114a is operatable via an electric adjustment of a seat controlling unit.

In FIGS. 11 and 12 a further exemplary embodiment of the invention is shown. The following description and the drawings are essentially limited to the differences between the exemplary embodiments, wherein regarding identically denominated components, in particular components having the same reference numerals, the drawings and/or the description of the other exemplary embodiment, in particular of FIGS. 1 to 10, may principally be referred to. For distinguishing between the exemplary embodiments, the letter a has been added to the reference numerals of the exemplary embodiment of FIGS. 1 to 10. In the exemplary embodiment of FIGS. 11 and 12 the letter a has been substituted by the letter b.

FIGS. 11 and 12 show a second exemplary embodiment of the aircraft seat device according to the invention. The aircraft seat device comprises a shell element 12b. The shell element 12b is part of the aircraft seat region. The aircraft seat comprises a table unit 24b. The table unit 24b is connected to the shell element 12b. The table unit 24b is in particular configured, in at least one position, to provide a table surface 26b, i.e. in particular a deposition surface for a passenger sitting on the aircraft seat. Differently than in the first exemplary embodiment, the table unit 24b is not implemented in two parts. The table unit 24b is implemented by a single table base body 28b.

The aircraft seat device comprises a support device 34b, which is configured to support the table unit 24b movably. The support device 34b is configured to support the table unit 24b movably relative to the shell element 12b. The support device 34b is preferably in particular configured for an adjustment of the table unit 24b between a stowage position and a usage position. Preferably the support device 34b is configured for an adjustment of the table unit 24b into an intermediate position that is situated between the stowage position and the usage position. In the stowage position the table unit 24b is obliquely attached to the shell element 12b. The support device 34b is configured to connect the table unit 24b obliquely to the shell element 12b in the stowage position. Differently than in the first exemplary embodiment, the table unit 24b is in the stowage position arranged in the shell element 12b such that it is rotated by 90 degrees. A front side and a rear side of the table unit 24b respectively face towards the side walls 18b, 20b of the shell element 12b. It is possible, by way of an appropriate support of the table unit 24b, to realize a larger table unit 24b, in particular a one-part table unit 24b having a greater width.

For an adjustment of the table unit 24b, the support device 34b comprises at least one linear bearing unit 36b, which essentially corresponds to the one of the first exemplary embodiment. The support device 34b comprises a support arm 48b. The support arm 48a is configured to connect the table unit 24b to the shell element 12b. For a pivotable arrangement of the table unit 24b, the support device 34b comprises a rotational bearing unit 54b. The rotational bearing unit 36b is configured to pivot the table unit 24b between the stowage position and at least the intermediate position which is situated substantially in a horizontal plane. Differently than in the first exemplary embodiment, the support device 34b comprises a further rotational bearing unit 100b. The further rotational bearing unit 100b is configured to pivot the table unit 24b by 90 degrees in a horizontal plane. By means of the rotational bearing unit 100b, the table unit 24b is pivotable by 90 degrees out of the intermediate position in such a way that the front side of the one-part table base body 28b faces toward the aircraft seat. Differently than in the drawings concerning the first exemplary embodiment, the table unit 24b and in particular the support arm 48b are illustrated in a simplified manner. In particular, a second side of the support arm 48b is not shown in the drawings.

The invention claimed is:

1. An aircraft seat device comprising:
   at least one shell element that defines a hollow that faces toward an aircraft seat and that forms a space in which an ottoman is arranged, wherein the hollow is defined by a first side wall, a second side wall, and an inclined upper wall of the shell element, at least one table unit, and at least one support device that is configured to obliquely connect the at least one table unit to the shell element at least in a stowage position, wherein in the stowage position the table unit is arranged completely in a space spanned by the shell element and covered by the inclined upper wall of the shell element, the support device comprising at least one rotational bearing unit, which is configured for pivoting the table unit between the stowage position and at least one intermediate position that is situated substantially in a horizontal plane, the support device comprising at least one linear bearing unit, which is configured for traversing the table unit between the intermediate position and at least one completely deployed usage position that is close to a seat.

2. The aircraft seat device according to claim 1, wherein the linear bearing unit forms a bearing axis, which is oriented obliquely to a mounting plane.

3. The aircraft seat device according to claim 1, wherein the support device comprises at least one locking unit, which locks the table element in the intermediate position.

4. The aircraft seat device according to claim 3, wherein the locking unit comprises at least one actuation element, by means of which the locking unit can be unlocked and the table element can be moved out of the intermediate position.

5. The aircraft seat device according to claim 3, wherein the locking unit comprises at least one securing unit, which prevents an unlocking until the table unit is completely arranged in the intermediate position.

6. The aircraft seat device according to claim 1, wherein the table unit is implemented of a table base body and at least one table body, which is arranged so as to be pivotable in a transverse direction relative to the table base body.

7. The aircraft seat device according to 1, wherein the table unit comprises at least one abutment element, which is configured, in a deployed state of the table unit, to prevent a displacement of the table unit from a usage position into the intermediate position.

8. The aircraft seat device according to claim 1, wherein the support device comprises at least one locking module, by means of which the table unit can be secured on the shell element in the stowage position.

9. The aircraft seat device according to claim 8, wherein the locking module comprises at least one securing element which is configured, for a securing of the table unit, to engage into the table unit sidewise in a form-fit fashion.

10. The aircraft seat device according to claim 1, wherein the linear bearing unit comprises at least two guiding rails, which extend in parallel and are arranged in a side wall of the shell element.

11. The aircraft seat device according to claim 1, wherein the support device comprises at least one support arm, which is linear displaceable by means of the linear bearing unit and is connected to the table unit so as to be pivotable via the rotational bearing unit.

12. The aircraft seat device according to claim 1, wherein the support device comprises a usage position securing unit, which is configured for securing the table unit in the usage position when the table unit is not arranged in the intermediate position.

13. The aircraft seat device according to claim 11, wherein the support arm forms a supplemental element in a region arranged behind the table.

14. The aircraft seat device according to claim 11, wherein the support arm comprises at least one support surface, via which the table unit is at least partly supported in the usage position.

* * * * *